United States Patent [19]

Oakes

[11] 4,116,226

[45] Sep. 26, 1978

[54] OIL SEPARATION AND HEAT RECOVERY SYSTEM

[75] Inventor: William J. Oakes, Chambersburg, Pa.

[73] Assignee: Nibble With Gibble's Inc., Chambersburg, Pa.

[21] Appl. No.: 785,027

[22] Filed: Apr. 6, 1977

[51] Int. Cl.² ................... F24C 15/32; A47J 36/38
[52] U.S. Cl. ................... 126/299 D; 55/222; 55/223; 55/244; 55/269; 203/87
[58] Field of Search .......... 126/299 D; 55/222, 223, 55/244, 269, DIG. 36; 203/87

[56] References Cited

U.S. PATENT DOCUMENTS

| | | | |
|---|---|---|---|
| 3,835,796 | 9/1974 | Sanga | 55/244 |
| 3,889,581 | 6/1975 | Bray, Sr. | 55/DIG. 36 |

*Primary Examiner*—Allen M. Ostrager
*Attorney, Agent, or Firm*—Charles L. Lovercheck

[57] ABSTRACT

An oil separation and heat recovery system for separating oil vapor from steam and recovering the oil and heat from the steam which incorporates an inclined duct connected to a barometric condenser with a container for oil at the lower end of the condenser. Oil entrained in the steam is carried up the duct and over the barometric condenser. The steam heats the condenser water that is recovered while the entrained oil flows back down the duct into a recovery container.

6 Claims, 1 Drawing Figure

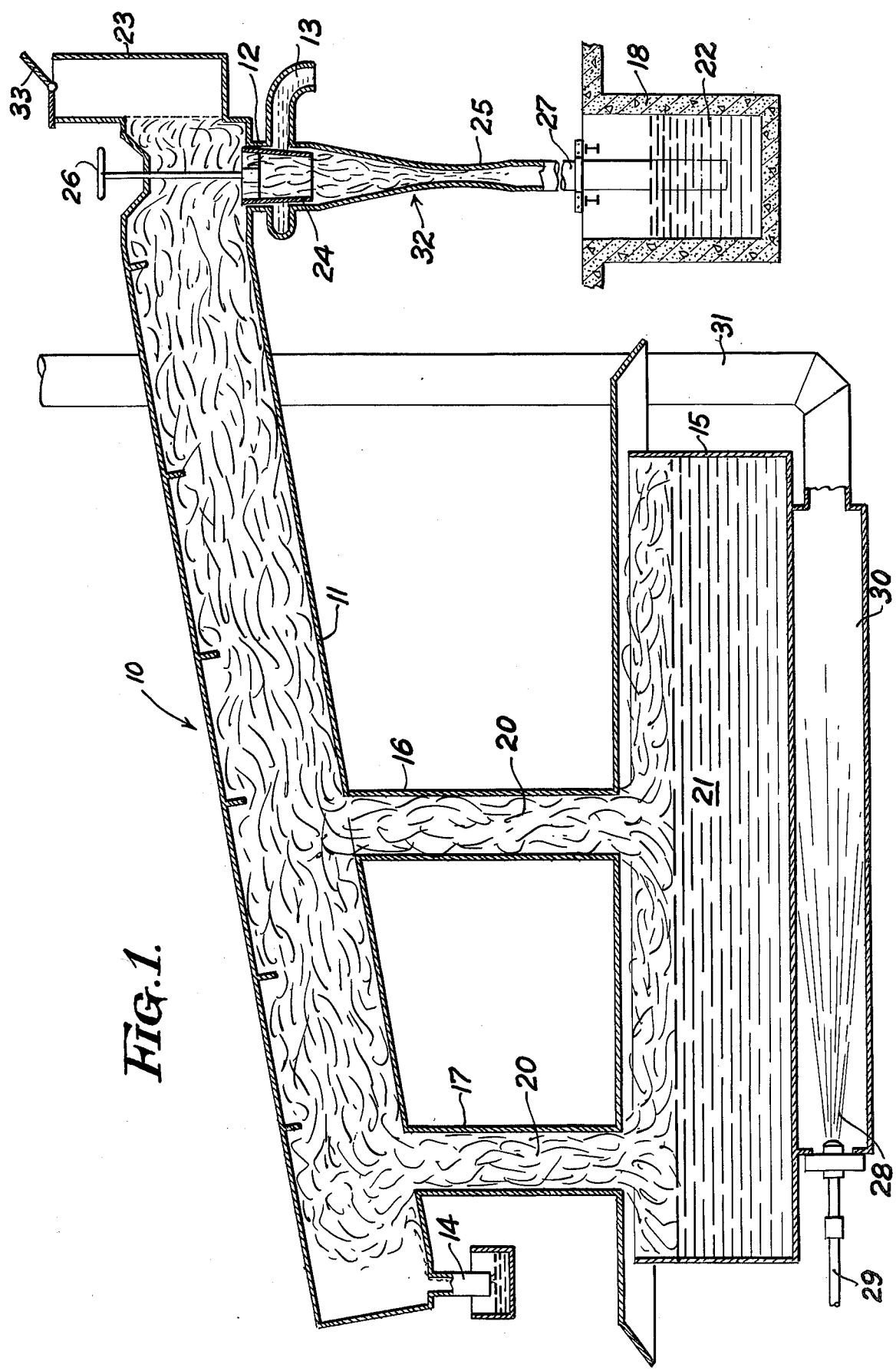

4,116,226

OIL SEPARATION AND HEAT RECOVERY SYSTEM

GENERAL STATEMENT OF THE INVENTION

This invention relates to restaurant or commercial cooking equipment and more particularly to an improvement in containing the steam generated by such equipment for the purpose of heat recovery and oil extraction. Steam from commercial cooking equipment contains odors that exist from such cooking which are objectionable to neighboring establishments and residential areas. The steam is exhausted to the atmosphere in conventional equipment of this type. This permits oil droplets to be carried to the atmosphere and odors escape to the surrounding areas. Generally, no attempt is made to recover the heat energy contained in the steam.

OBJECTS OF THE INVENTION

It is an object of the invention to provide an improved apparatus to recover oil vapor contained in steam from a cooking process for reuse, rather than permitting it to escape into the ambient atmosphere, and, thereby, contaminating the atmosphere.

Another object of the invention is to provide an apparatus for restricting the escape of odors from cooking processes.

Another object of the invention is to provide a heat and oil recovery apparatus which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWING

FIG. 1 is a diagrammatic view of the apparatus according to the invention.

DETAILED DESCRIPTION OF THE DRAWING

Now, with more particular reference to the drawing, the oil separation and heat recovery system is indicated generally at 10. It is made up generally of an inclined duct 11 connected at its upper end to the barometric condenser 32. A cold water inlet 13 is connected to the condenser and an oil outlet 14 is connected to the lower end of the duct. The steam and oil vapor 20 pass from the cooking medium 21 in the container 15 through ducts 16 and 17 and hot water from the condenser is collected in the container 18 and may be used for heating or as plant process water.

The container 15 is heated by a suitable means, for example, gas jet 28 supplied fuel by line 29. Hot gas in duct 30 heats the container 15 and carries out the cooking process. An air vent 31 acts as an exhaust for hot gases.

The duct work 16, 17 which leads from the container 15 into the inclined duct 11 and thence into the barometric condenser 32 provides a means of heating 5 pounds of water from 32° F. to 212° F. for every pound of steam condensed. The introduction of 5 pounds of cooling water through the cold water inlet 13 provides the means of absorption of heat of vaporizaton of 1 pound of steam. Condensing 1 pound of steam to water results in a decrease in volume of that area in the condenser and creates a vacuum to induce movement of steam forward in the duct 11 to the condenser 32. The resulting heated water in container 18 provides a supply of hot water for plant and process use. It also provides the means of recovering a large portion of that energy expended to heat the oil to the temperature required for cooking. In the light of the present energy shortage, the recovery effected by this invention becomes extremely important.

THE BAROMETRIC CONDENSER

The mixture of condensed steam or condensate, and cooling water combine and collect as hot water in container 18. The duct 11 is vented to the atmosphere by throttle 33, by vents at 23 to the pressure of the atmosphere. The barometric condenser 32 requires no pump, as the discharge is accomplished by the falling of the water in cone 24 under the effect of gravity. The exhaust steam enters the head of the condenser by way of the pipe 12 and is discharged downwards through the cone 24 into the tapered condensing chamber 25. The injection water is led by a cold water inlet 13 into the ring-shaped chamber surrounding the cone 24 and is discharged downwards in a thin conical sheet through the narrow opening between the cone 24 and the wall of the condensing chamber 25. The size of this annular opening may be varied by raising or lowering the cone 24 by means of the hand wheel 26. The cooling water and the condensed steam fall down through the long pipe 27 and are discharged into the container 18 that seals the lower end of the discharge pipe.

The foregoing specification sets forth the invention in its preferred, practical forms but the structure shown is capable of modification within a range of equivalents without departing from the invention wich is to be understood is broadly novel as is commensurate with the appended claims.

The embodiments of the invention in which an exclusive property or privilege is claimed are defined as follows:

1. An oil separation and heat recovery system comprising,
    an inclined duct,
    means supporting said duct adjacent a source of steam and oil vapor,
    means connecting said duct to said source of steam and oil vapor,
    a barometric condenser connected to the upper end of said duct,
    water inlet means connected to said duct,
    a hot water container at the lower end of said barometric condenser,
    and a container for oil at the lower end of said duct.

2. The combination recited in claim 1 wherein said source of steam and oil vapor comprises,
    a deep fat fryer.

3. The combination recited in claim 1 wherein said barometric condenser comprises,
    an elongated, tubular member having a Venturi-shaped portion at the intermediate part and a cylindrical portion at its upper end,
    a conical-shaped member in said cylindrical portion providing a restriction for flow of fluid therein, and a source of cold water connected to said tubular member adjacent to said conical-shaped member whereby cold water flows into said tube adjacent said conical-shaped member condensing steam from said duct and providing a low pressure drawing condensate from said steam through said tubular member to said hot water container.

4. The combination recited in claim 3 wherein means are provided for adjusting the position of said conical-shaped member in said generally cylindrical portion of said tube,
whereby the amount of restriction of said tubular member can be controlled.

5. The combination recited in claim 4 wherein said inclined duct is inclined approximately 10° to the horizontal.

6. The combination recited in claim 1 wherein said hot water container is connected to a process means for a useful purpose.

* * * * *